June 13, 1972   S. L. STOKES   3,669,504

CONTROL VALVE

Filed May 20, 1970

INVENTOR
STANLEY L. STOKES
BY
Joseph E. Papin.

3,669,504
CONTROL VALVE
Stanley L. Stokes, Florissant, Mo., assignor to Wagner Electric Corporation, Newark, N.J.
Filed May 20, 1970, Ser. No. 39,069
Int. Cl. B60t 8/26, 11/34
U.S. Cl. 303—6 C
18 Claims

ABSTRACT OF THE DISCLOSURE

A control valve for use in a hydraulic brake system having a pressure source and a pressure responsive brake is provided with an aligned and interconnected pair of proportioning members in series flow relation which respectively proportion the fluid pressure supplied from said source to said brake. One of the proportioning members is actuated in response to supplied fluid pressure from the source in excess of a predetermined value to effect the application of proportionally reduced pressure to the brake, and the other of the proportioning members is aligned with and slidably received in the one proportioning member being actuated in response to the proportionally reduced pressure of another predetermined value predeterminately in excess of the first named predetermined value to further proportionally reduce the pressure applied to said brake.

---

This invention relates in general to hydraulic brake systems and in particular to a control valve for proportioning the pressure of said system under preselected conditions.

SUMMARY

In the past various types of control valves have been utilized in a hydraulic brake system to provide a two-step or double-knee point proportioning of the fluid pressure supplied from the fluid pressure source to energize the vehicle rear brakes in order to allow the actual front brake to rear brake torque distribution to approach the theoretical or ideal torque distributions therebetween. One of the disadvantageous features of such past control valves was that the two-step or double-knee point proportioning was accomplished by effecting an area change on the proportioning piston at a predetermined fluid pressure which necessitated somewhat complex valving and usually resulted in complex tolerances and concentricity manufacturing problems.

The principal object of the present invention is to provide a control valve for effecting double-knee point proportioning which overcomes the aforementioned disadvantageous or undesirable features.

Another object of the present invention is to provide a control valve for effecting double-knee point proportioning utilizing aligned proportioning members one of which is slidably movable in the other.

These objects, as well as other objects and other advantageous features of the present invention, will become apparent hereinafter.

Briefly, the present invention embodies a control valve having a pair of modulating means for respectively controlling the application therethrough of supplied fluid pressure, one of said modulating means being generally operable in response to the supplied fluid pressure in excess of a predetermined value to perform a fluid modulating operation thereon for varying and reducing the applied fluid pressure, and the other of said modulating means including means movable in said one modulating means, said other modulating means being operable generally in response to the applied pressure in excess of another predetermined value predeterminately in excess of the first-named predetermined value to also perform a fluid modulating operation therein for further reducing the applied pressure.

DRAWING DESCRIPTION

Figure 1:
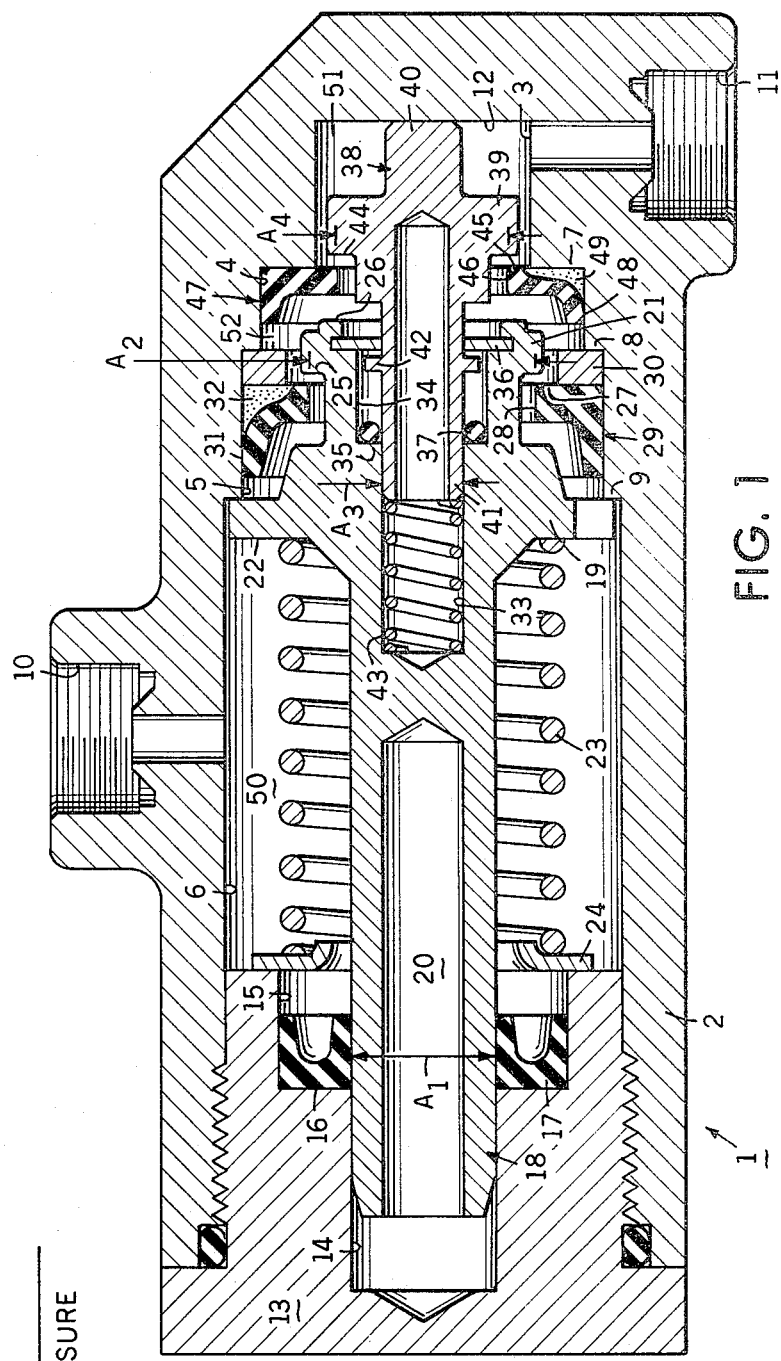
Figure 2:
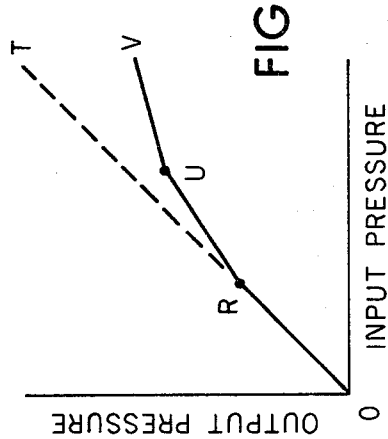

In the drawings which form a part of the specification and wherein like numerals refer to like parts wherever they occur:

FIG. 1 is a sectional view illustrating a control valve embodying the present invention in cross section, and FIG. 2 is a graphical representation illustrating the applied or output fluid pressure effected by the control valve, FIG. 1 in response to the supplied or input fluid pressure.

Referring now to the drawings in detail and in particular to FIG. 1, a control valve 1 is provided with a housing 2 having a bore 3 therein coaxially aligned with stepped counterbores 4, 5 and 6, and shoulders 7, 8 and 9 are defined on said housing between the bore 3 and counterbore 4 and between counterbores 4, 5 and 5, 6, respectively. Inlet and outlet ports, 10, 11, which are respectively adapted for connection with a master cylinder and the rear brakes of a vehicle brake system (not shown), are provided in said housing 2 intersecting the counterbore 6 adjacent mid-portion thereof and the bore 3 adjacent the end wall 12 thereof, respectively, and the open end of the counterbore 6 is closed by a closure member or end plug 13 threadedly received therein. Stepped bores 14, 15 having a shoulder 16 therebetween are provided in the closure member 13, and an annular seal 17 is provided in sealing engagement with the larger stepped bore 15 and seated against the shoulder 16 about the smaller stepped bore 14.

A modulating or proportioning member, such as the piston indicated generally at 18, is provided with a head portion 19 integrally formed between opposed reduced extensions or stem portions 20, 21, and a radially extending hexagonally-shaped guide flange 22 is provided on said head portion in sliding and guiding engagement with the housing counterbore 6. The extension 20 is slidably and guidably received in the closure member stepped bore 14 extending through the closure member seal 17 in sealing engagement therewith, and a proportioning or metering spring 23 is interposed between the proportioning piston head 19 and a retainer 24 urging said retainer into abutment with the interior end of the closure member 13 and urging the proportioning piston 18 toward its normal or inoperative position engaging the guide flange 22 thereof with the housing shoulder 9. The proportioning piston 18 is provided with an annular valve member 25 thereon between the head portion 19 and a free end 26 of the piston extension 21, and in the inoperative position of said proportioning piston, said valve member is spaced from a cooperating valve seat 27 provided about an aperture 28 extending axially through a seating member indicated generally at 29. An annular spacer or housing shoulder extension 30 is received in the housing counterbore 5 in abutting engagement with the housing shoulder 8, and the seating member 29 is normally positioned in seating engagement with the spacer 30, said seating member aperture 28 being radially spaced from the periphery of the proportioning piston 18. A peripheral lip portion 31 is integrally provided on the seating member 29 normally in sealing engagement with the housing counterbore 5 to close return flow passages 32 provided across said seating member. A bore and counterbore 33, 34 are provided in the proportioning piston 18 intersecting with the free end 26 of the piston extension 21, and a shoulder 35 is defined on said proportioning piston between said bore and counterbore. An annular abutment, such as the washer or retainer 36, is positioned adjacent to the open end of the proportioning piston counterbore 34 by suitable means, such as staking, and an O-ring type seal 37 is normally seated against the proportioning piston shoulder 35 in sealing engagement with the proportioning piston counterbore 34 about the proportioning piston bore 33.

Another modulating or proportioning member, such as the piston indicated generally at 38, is provided with a head portion 39 integrally formed between opposed reduced extensions or stem portions 40, 41, and the extension 41 extends co-axially through the proportioning piston counterbore 34 and the O-ring seal 37 in sealing engagement therewith into sliding and guiding engagement with the proportioning piston bore 33. A radially extended flange or abutment 42 is integrally provided on the proportioning piston extension 40 and slidably received in the proportioning piston counterbore 34, and another metering or proportioning spring 43 is provided in the proportioning piston bore 33 being biased between the proportioning piston 18 and the proportioning piston extension 40 normally urging the proportioning piston 38 toward its inoperative position with the flange 42 urged toward displacement-preventing engagement with the abutment 36 of the proportioning piston 18. The proportioning piston 38 is provided with another annular valve member 44 thereon between the head portion and extension 39, 41 thereof which, in the inoperative position of said proportioning piston, is spaced from a cooperating valve seat 45 provided about an aperture 46 extending axially through another seating member, indicated generally at 47. The seating member 47 is normally positioned in seating engagement with the housing shoulder 7, and the seating member aperture 46 is radially spaced from the periphery of the proportioning piston 38. A peripheral lip portion 48 is integrally provided on the seating member 47 normally in sealing engagement with the housing counterbore 4 to close return flow passages 49 provided across said seating member.

An inlet chamber 50 is defined in the housing counterbores 5, 6 between the seating member 29 and the closure member 13 in open pressure fluid communication at all times with the inlet port 10, and an outlet chamber 51 is defined in the housing bore 3 between the seating member 47 and the end wall 12 of said housing bore in open pressure fluid communication with the outlet port 11 at all times. Another intermediate chamber 52 is defined in the housing bore 4 between the seating members 29, 47, and said intermediate chamber is normally connected in open pressure fluid communication between the inlet and outlet chambers 50, 51 when the proportioning pistons 18, 38 are in their normal or inoperative positions, as discussed hereinafter.

It should be noted that the sealing engagement of the extension 20 on the proportioning piston 18 with the closure member seal 17 defines an effective area $A_1$ subjected to the atmosphere in the closure member stepped bore 14 at all times, and the sealing engagement between the proportioning piston valve member 25 and its cooperating seating member valve seat 27 defines another effective area $A_2$ subjected to the fluid pressure in the intermediate chamber 52, said area $A_2$ being opposed to and predeterminately greater than the area $A_1$. Another effective area $A_3$ is provided on the extension 41 of the proportioning piston 38 being defined by the sealing engagement of said extension with the O-ring seal 37 and subjected to atmosphere in the bore 33, and the sealing engagement of the proportioning piston valve member 44 with its cooperating seating member valve seat 45 defines another effective area $A_4$ on the proportioning piston 38 subjected to the fluid pressure in the outlet chamber 51 at all times, said area $A_4$ being opposed to and predeterminately greater than the area $A_3$. To conclude the description of the control valve 1, it should be noted that the areas $A_1$, $A_3$ are respectively predeterminately greater than the areas $A_2$, $A_4$, the areas $A_1$, $A_2$ are respectively predeterminately greater than the areas $A_3$, $A_4$, and the pre-compressive force $Fc$ of the proportioning spring 43 is predeterminately greater than the pre-compressive force $Fs$ of the proportioning spring 23.

In the operation with the component parts of the control valve 1 in their inoperative positions as shown in the drawings and as described hereinabove, a supplied or input fluid pressure $P_1$ at the inlet port 10 flows through the inlet, intermediate and outlet chambers 50, 52 and 51 to establish an applied or output fluid pressure $P_2$ at the outlet port 11. The input fluid pressure $P_1$ acts on the effective area $A_1$ of the proportioning piston 18 to establish a closing force $P_1A_1$ tending to urge said proportioning piston against the compressive force $Fs$ of the metering spring 23; however, the metering spring force $Fs$ opposes movement of said proportioning piston until the input fluid pressure $P_1$ attains a predetermined value R, as shown on the line ORT in the graphical representation of FIG. 2. When the predetermined value R of the input fluid pressure $P_1$ is attained, the closing force $P_1A_1$ overcomes the compressive force $Fs$ of the metering spring 23 to move the proportioning piston 18 leftwardly from its inoperative position toward an isolating position. The movement of the proportioning piston 18 toward its isolating position engages the valve member 25 with the sealing member valve seat 27 closing the seal member aperture 28 to isolate the input fluid pressure $P_1$ in the inlet chamber 50 from the output fluid pressure $P_2$ in the intermediate and outlet chambers 52, 51, and upon the engagement of said valve member with said valve seat, the input fluid pressure $P_1$ acts on the effective input area $A_2-A_1$ of the proportioning piston 18 to establish an input force $P_1(A_2-A_1)$ which is additive to the spring force $Fs$ to substantially balance the opposed output force $P_2A_2$ established by the output fluid pressure $P_2$ acting on the effective output area $A_2$ of said proportioning piston.

From the graphical representation in FIG. 2, it is obvious that an increase in the magnitude in the input fluid pressure $P_1$ in excess of the value R, as shown by the line ORT, will result in proportionally reduced increases in the output fluid pressure $P_2$, as shown by the line RU. For instance, when the input fluid pressure $P_1$ is increased to a value in excess of the predetermined value R, the input force $P_1(A_2-A_1)$ is correspondingly increased and additive to the metering spring force $Fs$ to overcome the output force $P_2A_2$; therefore, the metering piston 18 is moved in a rightward direction toward a metering position disengaging the valve member 25 thereof from the seating member valve seat 27 to effect a metered application of the input fluid pressure $P_1$ from the inlet chamber 50 through the seating member aperture 28, the intermediate chamber 52, and the outlet chamber 51 to the outlet port 11 to effect a proportional increase of the output fluid pressure $P_2$ in a predetermined ratio with the input fluid pressure $P_1$ at the inlet port 10, as shown by the line RU in the graphical representation of FIG. 2 wherein $$P_2 = \frac{P_1(A_2 - A_1) + Fs}{A_2}$$

Of course, the increased output fluid pressure $P_2$ effects a corresponding increase in the output force $P_2A_2$, and when the increased output force $P_2A_2$ attains an increased value substantially equal to that of the increased input force $P_1(A_2-A_1)$ and the additive metering spring force $Fs$, the proportioning piston 18 is again moved toward its isolating position to re-engage the valve member 25 with the seating member valve seat 27 to again isolate the increased input fluid pressure $P_1$ from the proportionally increased output fluid pressure $P_2$. It is, of course, obvious that the proportioning piston 18 will be responsive to the further increases in the input fluid pressure $P_1$ to effect further correspondingly proportional increases in the output fluid pressure $P_2$ in the same manner as previously described.

The output fluid pressure $P_2$ also acts on the effective area $A_3$ of the proportioning piston 38 to establish another closing force $P_2A_3$ urging said proportioning piston against the compressive force $Fc$ of the metering spring 43; however, the metering spring force $Fc$ prevents movement of said proportioning piston until the output fluid pressure $P_2$ attains the predetermined value U, as shown on the line RUV in the graph of FIG. 2. When the predetermined value U is attained, the closing force $P_2A_3$ overcomes the compressive force $Fc$ of the metering spring 43 to move the proportioning piston 38 leftwardly from its inoperative position toward an isolating position and relative to the proportioning piston 18 thereby disengaging the flange 42 from the abutment 30. The movement of the proportioning piston 38 to its isolating position engages the valve member 44 thereof with the seating member valve seat 45 closing the seating member aperture 46 to isolate the fluid pressure $P_2$ in the intermediate chamber 52 from another applied or output fluid pressure $P_3$ in the outlet chamber 51 and at the outlet port 11, and upon the engagement of said valve member with said valve seat, the fluid pressure $P_2$ in said intermediate chamber acts on the effective input area $A_4-A_3$ of the proportioning piston 38 to establish another input force $P_2(A_4-A_3)$ additive to the spring force $Fc$ to substantially balance the output fluid pressure in the outlet chamber 51 which acts on the effective area $A_4$ in opposition to the input force $P_2(A_4-A_3)$.

From the graphical representation in FIG. 2, it is obvious that increases in the magnitude of the fluid pressure $P_2$ in excess of the predetermined value U will result in a further proportionally reduced increase in the output fluid pressure $P_3$, as shown by the line UV. For instance, when the fluid pressure $P_2$ is increased to a value in excess of the predetermined value U, the input force $P_2(A_4-A_3)$ is correspondingly increased and additive to the metering spring force $Fc$ to overcome the output force $P_3A_4$; therefore, the metering piston 38 is moved rightwardly toward its metering position disengaging the valve member 44 thereof from the seating member valve seat 45 to effect a metered application of the increased fluid pressure $P_2$ through the seating member aperture 46 and the outlet chamber 51 to the outlet port 11 to effect a proportional increase of the output fluid pressure $P_3$ is a predetermined ratio with the fluid pressure $P_2$ in the intermediate chamber 52, as shown by the line UV in the graph of FIG. 2 wherein $$P_3 = \frac{P_2(A_4-A_3)+Fc}{A_4}$$

Of course, the increased output fluid pressure $P_3$ effects a corresponding increase in the output force $P_3A_4$, and when the increased output force $P_3A_4$ attains an increased value substantially equal to that of the increased input force $P_2(A_4-A_3)$ and the additive metering spring force $Fc$, the proportioning piston 38 is again moved leftwardly toward its isolating position to re-engage the valve member 44 thereof with the seating member valve seat 45 to again isolate the increased fluid pressure $P_2$ in excess of the predetermined value U from the proportionally increased output fluid pressure $P_3$. It is of course obvious that the proportioning piston 38 will be responsive to further increases in the fluid pressure $P_2$ to effect further correspondingly proportional increases in the output fluid pressure $P_3$ in the same manner as previously described.

Upon the elimination of the input fluid pressure $P_1$, the input force $P_1(A_2-A_1)$ acting on the proportioning piston 18 is also eliminated, and the fluid pressure $P_2$ in the intermediate chamber 52 acting on the seating member 29 displaces the sealing lip 31 thereof from sealing engagement with the housing counterbore 5 to open the return flow passages 32 across said seating member; and, in this manner, the fluid pressure $P_2$ returns from the intermediate chamber 52 through the open return flow passages 32 and the inlet chamber 50 to the inlet port 10. When the fluid pressure $P_2$ is so reduced to correspondingly reduce the output force $P_2A_2$ to a value less than the metering spring force $Fs$, the metering spring 23 moves the proportioning piston 18 rightwardly to its original or inoperative position and disengages the valve member 25 from the seating member valve seat 27 to again open the seating member aperture 28 re-establishing open pressure fluid communication therethrough between the inlet and intermediate chambers 50, 52, to effect a complete elimination of the fluid pressure $P_2$.

While the fluid pressure $P_2$ is being reduced to effect complete reduction of the output force $P_2A_2$ on the proportioning piston 18, as described hereinabove, it is apparent that such reduction of the fluid pressure $P_2$ also effects a simultaneous corresponding reduction of the input force $P_2(A_4-A_3)$ acting on the proportioning piston 38, and upon elimination of the input force $$P_2(A_4-A_3)$$

the output fluid pressure $P_3$ acting on the seating member 47 displaces the sealing lip 48 thereof from sealing engagement with the housing counterbore 4 to open the seating member return flow passages 49. In this manner, the fluid pressure $P_3$ returns from the outlet port 11 through the outlet chamber 51, the open return flow passages 49 of the seating member 47 into the intermediate chamber 52 and therefrom through the inlet chamber 50 to the inlet port 10 as previously described. When the fluid pressure $P_3$ is further reduced to correspondingly reduce the output force $P_3A_4$ to a value less than the metering spring force $Fc$, the metering spring 43 moves the proportioning piston 38 rightwardly to its original position re-engaging the piston extension 41 with the end wall of the housing bore 3 and disengaging the valve member 44 thereof from the seating member valve seat 45 to again open the seating member aperture 46, re-establishing open pressure fluid communication between the inlet and outlet ports 10, 11 through the outlet, inlet and intermediate chambers, 51, 50 and 52 to effect the complete elimination of the fluid pressure $P_3$.

While the foregoing description of the control valve 1 illustrates the proportioning operation of the proportioning member 18 to vary the fluid pressure immediately downstream thereof toward the outlet port 11 in response to the fluid pressure immediately upstream thereof toward the inlet port 10 prior to the proportioning operation of the proportioning member 38 to vary the fluid pressure immediately downstream thereof in response to the fluid pressure immediately upstream thereof, it is also contemplated that the proportioning operation of the proportioning member 38 can be, if desired, initiated prior to that of the proportioning member 18 by increasing the precompressive force $Fc$ of the metering spring 43 to a value predeterminately greater than the precompressive force $Fs$ of the metering spring 23 without substantially altering the operating characteristics of the control valve 1.

From the foregoing it is now apparent that a novel control valve 1 is described and changes or modifications as to the precise configuration, shape and details of the construction set forth in the disclosure by way of illustration may be made by those skilled in the art without departing from the spirit of the invention.

The embodiments of the invention in which an exclusive property or privilege is claimed are defined as follows:

1. A control valve comprising a housing having a pressure fluid flow passage therethrough, a pair of modulating means movable in said flow passage in series flow relation for performing modulating operations on the pressure fluid in said flow passage under preselected conditions, said pair of modulating means being operable generally in response to fluid pressures in said flow passage immediately upstream thereof of different predetermined values to thereby vary the fluid pressures immediately downstream thereof in said flow passage, respectively, and one of said modulating means including means movable in the other of said modulating means.

2. A control valve comprising a housing having a pressure fluid flow passage therethrough, a pair of proportioning means movable in said flow passage in series flow relation for performing proportioning operations on the pressure fluid in said flow passage under preselected conditions, said pair of proportioning means being operable generally in response to fluid pressures in said flow passage of one predetermined value and another predetermined value predeterminately greater than the one predetermined value toward positions isolating the fluid pressures upstream thereof from those downstream thereof and being thereafter further movable in response to increases in the fluid pressures upstream thereof toward metering positions effecting metered increases in the fluid pressures downstream thereof in predetermined ratio with the increased fluid pressures upstream thereof, respectively, and one of said proportioning means including other means movable in the other of said proportioning means.

3. A control valve according to claim 2, wherein said other means comprises extension means integral with said one proportioning means, said extension means being movable in said other proportioning means.

4. A control valve according to claim 3, comprising a bore in said other proportioning means, said extension means being slidable in said bore.

5. A control valve according to claim 2, wherein one of said one and other proportioning means includes a resiliently urged member, said resiliently urged member being initially movable against its own force in response to one of the one and other predetermined values of the fluid pressures in said flow passage acting thereon toward its isolating position and being thereafter further movable in response to the increased fluid pressure upstream thereof in excess of the one of the one and other predetermined values and assisted by its own force toward its metering position.

6. A control valve according to claim 5, wherein the other of said one and other proportioning means includes another resiliently urged member, said other resiliently urged member being initially movable against its own force in response to the other of the one and other predetermined values of the pressures in said flow passage acting thereon toward its isolating position and being thereafter further movable in response to the increased fluid pressure upstream thereof in excess of the other of the one and other predetermined values and assisted by its own force toward its metering position.

7. A control valve according to claim 5, wherein said resiliently urged member includes a proportioning piston movable in said housing, and resilient means engaged with said proportioning piston, said proportioning piston being movable against the force of said resilient means toward its isolating position and the force of said resilient means assisting movement of said proportioning piston to its metering position, and said other means including extension means slidable in said proportioning piston.

8. A control valve according to claim 7, comprising a valve seat in said housing about said flow passage for engagement with said proportioning piston, said valve seat being engaged by said proportioning piston in its isolating position and said proportioning piston being displaced from said valve seat in its metering position.

9. A control valve according to claim 6, wherein said other resiliently urged member includes a proportioning piston movable in said housing, said other means being integral with said proportioning piston, and resilient means engaged between said one of said one and other proportioning means and said proportioning piston, the force of said resilient means opposing and assisting movement of said proportioning piston to its isolating and metering positions, respectively.

10. A control valve according to claim 9, comprising a valve seat in said housing about said flow passage for engagement with said proportioning piston, said proportioning piston being engaged with said valve seat in its isolating position and disengaged therefrom in its metering position.

11. A control valve according to claim 9, wherein said other means includes an integral extension on said proportioning piston, a bore in said one of said one and other proportioning means, said extension means being slidable in said bore.

12. A control valve according to claim 11, wherein said resilient means includes a spring in said bore having one end engaged with said one of said one and other proportioning means and the other end thereof engaged with said extension.

13. A control valve according to claim 12, comprising first and second abutment means on said one and other proportioning means, respectively, said spring normally urging said second abutment means toward engagement with said first abutment means to prevent the displacement of said extension from said bore, said one proportioning means being concertedly movable with said other proportioning means when said first and second abutment means are engaged, and said first and second abutment means being disengaged upon the movement of said other proportioning means relative to said one proportioning means.

14. A control valve according to claim 2, wherein said other proportioning means includes a first resiliently urged member, said first resiliently urged member being initially movable against its own force in response to one of said one and other predetermined values of the fluid pressure in said flow passage acting thereon toward its isolating position and being thereafter further movable in response to the increased fluid pressure upstream thereof in excess of the one of said one and other predetermined values and assisted by its own force toward its metering position, said one proportioning means including a second resiliently urged member, said second resiliently urged member being initially movable against its own force in response to the other of said one and other predetermined values of the fluid pressure in said flow passage acting thereon toward its isolating position and being thereafter further movable in response to the increased fluid pressure upstream thereof in excess of the other of said one and other predetermined values and assisted by its own force toward its metering position, and said other means being integral with said first resiliently urged member and movable in said second resiliently urged member.

15. A control valve according to claim 14 wherein said first and second resiliently urged members respectively include first and second proportioning pistons movable in said housing, and first and second spring means engaged with said first and second proportioning pistons, the forces of said first and second spring means opposing and assisting movement of said first and second proportioning pistons to their isolating and metering positions, respectively, an end portion on said second proportioning piston, a bore in said second proportioning piston intersecting with said end portion, said other means including extension means on said first proportioning piston and slidable in said bore, and first and second abutment means on said first and second proportioning pistons on said extension means and adjacent to said end portion, respectively, said first spring means being in said bore and biased between said second proportioning piston and said extension means urging said first abutment means toward engagement with said second abutment means to prevent the displacement of said extension means from said bore, said first proportioning piston being concertedly movable with said second proportioning piston to its isolating and metering positions, and said first abutment means being disengaged from said second abutment means upon the movement of said second proportioning piston relative to said first proportioning piston.

16. A control valve according to claim 2, comprising spaced first and second sealing members in said housing about said flow passage, first and second aperture means extending through said first and second sealing members, first and second valve seats on said first and second sealing members about said first and second aperture means, the other of said proportioning means including a first piston slidable in said housing, a first end portion on said first piston extending through said first aperture means of said first sealing member, a first valve means on said first end portion for engagement with said first valve seat, a first spring engaged with said first piston and urging said first piston toward a normal inoperative position disengaging said first valve means from said first valve seat, a free end on said first end portion, and a bore in said first end portion intersecting with said free end, said one proportioning means including a second piston, said other means including extension means integral with said second piston and slidable in said bore, a second end portion on said second piston opposite to said extension means and extending through said second aperture means of said second sealing member, second valve means on said second end portion for engagement with said second valve seat, a second spring in said bore engaged between said first piston and said extension means and urging said second piston toward a normal inoperative position disengaging said second valve means from said second valve seat, and first and second abutments on said first and second pistons for displacement preventing engagement, said second spring normally urging said second abutment toward engagement with said first abutment to prevent the displacement of said extension means from said bore, said first piston being initially movable against the force of said first spring from its inoperative position to its isolating position in response to one of the one and other predetermined values of the fluid pressure in said flow passage acting thereon to engage said first valve means with said first valve seat and the force of said first spring assisting movement of said first piston in response to the increased fluid pressure acting thereon upstream of said first valve means in excess of the one of the one and other proportioning valves to its metering position disengaging said first valve means from said first valve seat, the engagement of said first and second abutment means effecting concerted movement of said second piston with said first piston, said second piston being initially movable relative to said first piston from its inoperative position to its isolating position against the force of said second spring in response to the other of the one and other predetermined values of the fluid pressure in said flow passage acting thereon to engage said second valve means with said second valve seat and the force of said second spring assisting movement of said second piston in response to the increased fluid pressure acting thereon upstream of said second valve means in excess of the other of the one and other predetermined values to its metering position disengaging said second valve means from said second valve seat.

17. A control valve comprising a housing having inlet, intermediate and outlet fluid pressure chambers therein, proportioning means movable in said housing for controlling pressure fluid communication between said inlet and intermediate chambers, said proportioning means being responsive to fluid pressure in said inlet and intermediate chambers in excess of a predetermined value to effect metered pressure fluid communication therebetween and establish fluid pressure in said intermediate chamber in a predetermined ratio with that in said inlet chamber, other proportioning means in series flow relation with said first named proportioning means for controlling pressure fluid communication between said intermediate and outlet chambers and including means movable in said first named proportioning means, said other proportioning member being responsive to fluid pressure in said intermediate and outlet chambers in excess of another predetermined value different than the first named predetermined value to effect metered pressure fluid communication between said intermediate and outlet chambers and establish a fluid pressure in said outlet chamber in another predetermined ratio with that in said intermediate chamber.

18. A control valve comprising a housing having inlet and outlet ports therein, a pair of spaced valve seats in said housing between said inlet and outlet ports, a pair of piston means movable in said housing including a pair of valve means for engagement with said valve seats, respectively, one of said piston means including extension means slidable in the other of said piston means, a pair of resilient means normally urging said piston means toward inoperative positions in said housing disengaging said valve means from said valve seats to establish open pressure fluid communication between said inlet and outlet ports, respectively, a chamber in said housing between said valve seats and normally connected in open pressure fluid communication with said inlet and outlet ports when said piston means are in their inoperative positions, a pair of opposed areas on said other piston means for respective subjection to the fluid pressures at said inlet port and in said chamber, said other piston means being movable from its inoperative position against one of said resilient means in response to fluid pressure at said inlet port and in said chamber of a predetermined value acting on the difference between said areas toward an isolating position engaging one of said valve means with one of said valve seats to interrupt pressure fluid communication between said inlet port and said chamber and said other piston means being thereafter further movable in response to increases in the fluid pressure at said inlet port in excess of the predetermined value acting on one of said areas and assisted by said one resilient means toward a metering position disengaging said one valve means from said one valve seat to establish metered pressure fluid communication between said inlet port and said chamber to effect a metered increase in the fluid pressure in said chamber acting on the other of said areas in a predetermined ratio with the increased fluid pressure at said inlet port, a pair of abutment means on said piston means, respectively, the other of said resilient means being engaged between said piston means normally urging said abutment means into engagement to effect concerted movement of said other piston means with said one piston means, a pair of opposed second areas on said one piston means respectively subjected to the fluid pressures in said chamber and at said outlet port, said one piston means being movable relatively to said other piston means against said other resilient means in response to fluid pressure in said chamber and at said outlet port of another predetermined value predeterminately greater than the first named predetermined value acting on the difference between said second areas toward an isolating position disengaging one of said abutment means from the other thereof and engaging the other of said valve means with the other of said valve seats to interrupt pressure fluid communication between said chamber and said outlet port and said one piston means being thereafter further movable in response to increases in the fluid pressure in said chamber in excess of the other predetermined value acting on one of said second areas and assisted by said other resilient means toward a metering position disengaging said other valve means from said other valve seat to establish metered pressure fluid communication between said chamber and said outlet port and effect a metered increase in the fluid pressure at said outlet port acting on the other of said second areas in a predetermined ratio with the increased fluid pressure in said chamber.

References Cited

UNITED STATES PATENTS

| | | | |
|---|---|---|---|
| 3,278,241 | 10/1966 | Stelzer | 303—6 C |
| 3,375,852 | 4/1968 | Milster | 303—6 C |
| 3,508,792 | 4/1970 | Bueler | 303—6 C |

MILTON BUCHLER, Primary Examiner

J. J. McLAUGHLIN, Assistant Examiner

U.S. Cl. X.R.

60—54.5 E; 188—349